Patented Jan. 3, 1933

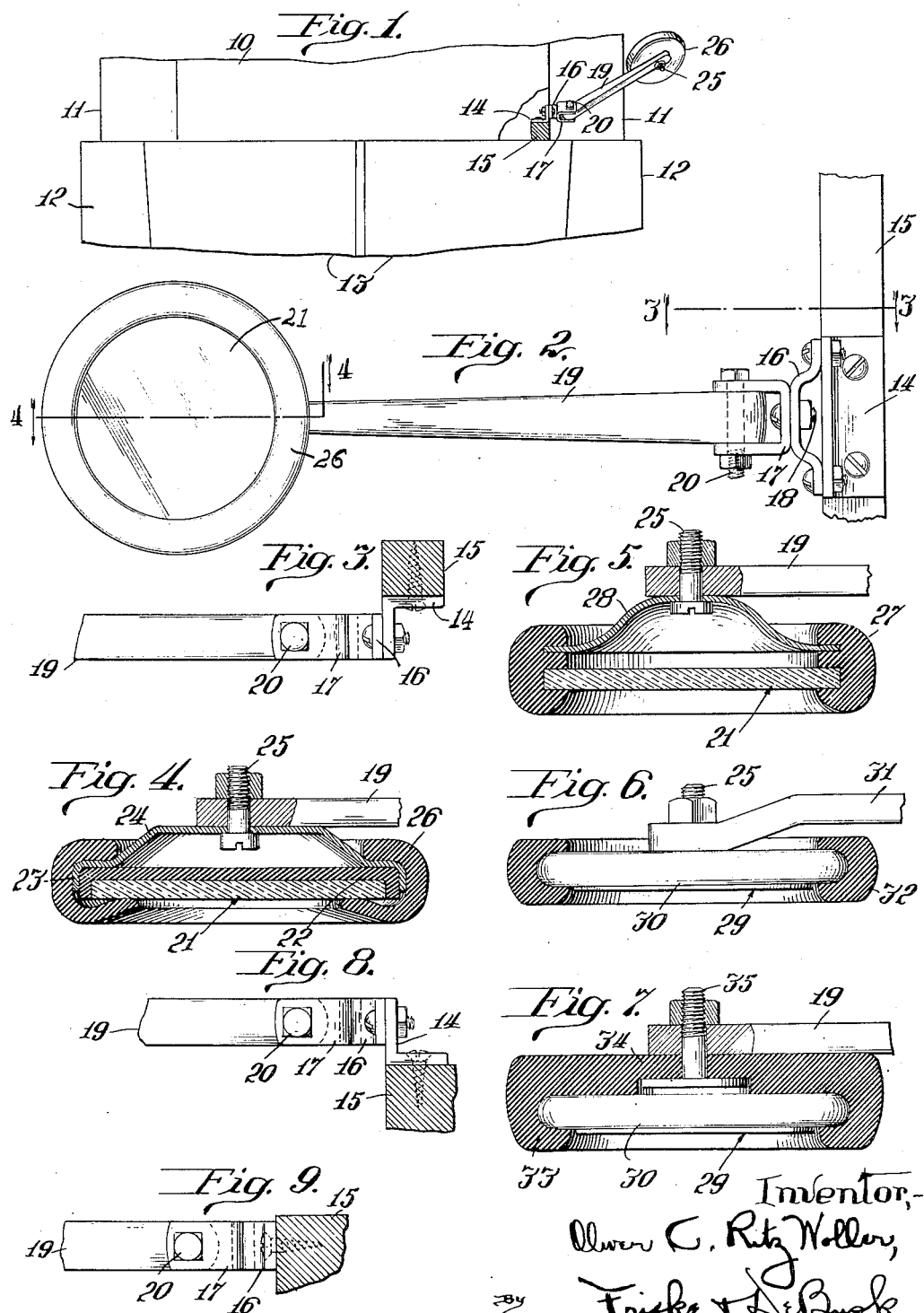

1,893,245

UNITED STATES PATENT OFFICE

OLIVER C. RITZ WOLLER, OF CHICAGO, ILLINOIS

MIRROR STRUCTURE FOR TRUCKS AND THE LIKE

Application filed January 15, 1930. Serial No. 420,826.

My invention relates to rear view mirror structures for trucks and has for its object the provision of a new and improved arrangement of parts by which a mirror may be supported yieldingly in position in such manner that it may give to the necessary extent for preventing breakage when brought into contact with an obstacle. As will be readily appreciated, a rear view mirror to be effective must extend out more or less beyond the side of the truck into such position that it is likely to be hit by other trucks or to be brought into contact with posts, buildings, or the like, when the truck is being driven and maneuvered in close quarters.

It is one of the objects of my invention to provide a yielding construction of the type specified which shall be capable of being given the required adjustments whereby the mirror face shall be held at the desired angular position for effective use and by which the adjustments may be readily effected. It is another object of my invention to provide a construction of this type which shall be neat and attractive in appearance.

It is another object of my invention to provide an arrangement of the type specified comprising a sheath of yielding material surrounding the mirror, or at least a ring of yielding material surrounding the edge portions of the mirror for affording protection with respect to the impact of the device with an obstacle. It is one of the objects of my invention to provide such a structure in which the surrounding ring of yielding material may serve also for holding the several parts in fixed position with respect to each other, the arrangement being such that the parts may be very quickly and easily assembled ready for use. It is another object of the invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a diagrammatic view showing the cabin of a truck of any approved form, provided with my improved mirror structure;

Fig. 2 is a rear face view of my improved mirror structure;

Fig. 3 is a horizontal cross section taken at line 3—3 of Fig. 2;

Fig. 4 is a horizontal cross section taken at line 4—4 of Fig. 2;

Figs. 5, 6 and 7 are views similar to Fig. 4 but showing modified forms of construction; and Figs. 8 and 9 are views similar to Fig. 3 but showing modified arrangements of the parts.

Referring now to Figs. 1 to 4, in which corresponding parts are indicated by the same reference characters, 10 indicates the cabin of a truck having running boards 11, fenders 12, and a hood 13, all of the parts being broken away for clearness of illustration.

In the construction shown in Figs. 2, 3 and 4, my improved mirror structure comprises an angle 14 secured by means of screws on the rear face of an upright bar 15 forming a part of the cabin 10 of the truck, the turned flange of the angle extending rearwardly from the bar 15. Upon the rearwardly extending flange of the angle 14, I have mounted a bracket 16 which is held in position by means of bolts, such bracket being in the form of a yoke having its central portion in spaced position with respect to the angle 14.

Upon the outer face of the bracket 16, I have pivotally mounted a clip 17, such pivotal mounting being effected by the use of a horizontally extending bolt 18 about which the clip 17 is adapted to turn on a horizontal axis. Between the oppositely disposed arms of the clip 17, I have pivotally mounted an arm 19 through the medium of a vertically extending bolt 20 about which the arm 19 is adapted to swing horizontally. As will be readily understood, when the nuts are tightened upon the bolts 18 and 20, the arm 19 is held by friction in comparatively rigid position, while being at the same time capable of yielding when a considerable force is applied thereto such as would otherwise cause breakage of the structure.

Upon the outer end of the arm 19, I have mounted my improved mirror as shown in Fig. 4. The construction there shown comprises a mirror 21 comprising a piece of plate glass in the construction shown such mirror being surrounded at its edge portion by means of a spacing and cushioning ring 22 formed preferably of paper. The mirror 21 and cushioning ring 22 are mounted within a flange 23 formed upon the edge of a rearwardly dished disc 24 of metal, the disc 24 being secured to the free end of the arm 19 by means of a bolt 25. The disc 24, the spacing ring 22, and the mirror 21 are held in fixed position with respect to each other through the medium of a ring 26 of yielding material stretched about the edges of the parts; as is clearly shown in Fig. 4, the ring 26 having an inwardly open groove for receiving such parts. The ring 26 serves for holding the parts effectively in position with respect to each other. As will be readily appreciated, the mirror structure comprising the ring 26 and the other parts as described is very simple and can be very easily and quickly assembled in shape for use. At the same time, the parts are held with sufficient firmness for normal use, and provision is made for ready substitution of parts as may be required. As will be readily understood, the disc 24 and ring 26 comprise in effect a sheath entirely surrounding the edge portions and the back face of the mirror 21 whereby the mirror is effectively protected.

In Fig. 5, a slightly different construction is shown; in such construction a ring 27 of yielding material having two inwardly open grooves is provided, one of such grooves receiving the mirror 21 and the other receiving a disc 28 serving to hold the mirror 21 and the disc 28 in fixed position with respect to each other without the use of the cushioning ring 22 and the flange 23.

In Fig. 6, a still different construction is shown. In this construction, the mirror 29 is mounted within a frame 30, such frame being mounted directly upon a slightly changed form of arm 31, the protecting ring 32 of yielding material being stretched about the frame 30. In this construction, the supporting and protecting sheath for the mirror 29 comprises the ring 32 of yielding material and the frame 30.

In Fig. 7, still another modified form is shown, in which a mirror 29 enclosed within a frame 30 is employed, such mirror and frame being mounted in position by means of a sheath comprising a ring portion 33 and a back wall portion 34 in the form of a supporting plate formed integrally with each other, the connection between the mirror and the arm 19 being effected through the medium of a bolt 35 engaging the integral back wall portion 34 rather than the frame 30 as in Fig. 6.

In Fig. 8, I have shown the bracket 14 mounted upon the front face of the bar 15 as distinguished from the arrangement shown in Fig. 3. In Fig. 8, the construction and arrangement are otherwise just the same as shown in Fig. 3, the bracket 16 and angle 14 being merely turned through an angle of 180° with respect to the clip 17.

In Fig. 9, I have shown still a different arrangement, in which the angle 14 is omitted, the bracket 16 being secured directly to the outer face of the bar 15.

By the use of the construction as shown in Figs. 3, 8 and 9, it will be appreciated that I have provided a universal mounting for my mirror, the arrangement being such that the mounting may be effected upon any face of a support as may be conveniently available, in any case the arm 19 being capable of being swung horizontally about the bolt 20 and of being rotated about the horizontally extending bolt 18 for bringing the face of the mirror 21 to any desired angular position.

While I prefer to employ the construction as shown in my drawing, it will be understood that I do not limit my invention thereto, except so far as the claims may be so limited by the prior art.

I claim:—

1. In a device of the type described, the combination of a mirror, a supporting member, a sheath comprising a back wall portion across the back of the mirror and a ring portion surrounding the edges of the mirror, said ring portion being of yieldable material and carried by said back wall portion and stretched into gripping engagement about the edges of the mirror thereby holding the mirror firmly but removably in position with respect to the sheath, and means for connecting said back wall portion of the sheath to said supporting member for supporting the mirror therefrom.

2. In a device of the type described, the combination of a mirror, a supporting member, a sheath comprising a back wall portion across the back face of the mirror and a ring of yielding material formed separately from the back wall portion and stretched into gripping engagement with the mirror and the back wall portion, and means for connecting said back wall portion of the sheath to said supporting member for supporting the mirror therefrom.

3. In a device of the type described, the combination of a mirror, a supporting member, a sheath comprising a back wall portion of rigid material and a ring of yielding material, said ring extending about the edges of the back wall portion and about the edges of said mirror, said ring serving to hold the mirror in fixed position therein, and means for connecting said back wall portion of the sheath to said supporting member for supporting the mirror therefrom.

4. In a device of the type described, the combination of a mirror, a supporting member, a sheath comprising a backwardly dished disc of metal and a ring of yielding material extending about the edges of the disc and the mirror for holding them in snug operative engagement with each other, and means for connecting said disc to said supporting member for supporting the mirror therefrom.

5. In a device of the type described, the combination of a mirror, a supporting member, a sheath comprising a backwardly dished disc of metal and a ring of yielding material extending about the edges of the disc and the mirror for holding them in fixed position with respect to each other, a cushioning ring interposed between said mirror and said disc within said sheath, and means for connecting said disc to said supporting member for supporting the mirror therefrom.

6. In a device of the type described, the combination of a mirror, a flanged spacing ring of cushioning material thereabout, a disc of metal in rear of said mirror with an edge flange surrounding said spacing ring and mirror, a ring of yielding material stretched about said disc and said mirror serving to hold them in snug operative engagement with each other, and means connected with said disc for supporting the mirror.

7. In a device of the type described, the combination of a mirror, a disc, a ring of yielding material having two inwardly open grooves adapted to hold said disc and mirror in spaced relation, and means connected with said disc for mounting the device in position.

8. In a device of the type described, the combination of a mirror, a sheath of yieldable material and comprising a back wall portion across the back wall of the mirror and a ring portion surrounding the edges of the mirror, said ring portion being integrally formed with said back wall portion and stretched into gripping engagement about the edges of the mirror thereby holding the mirror firmly but removably in position in the sheath, and means for connecting said back wall portion of the sheath to said supporting member for supporting the mirror therefrom.

OLIVER C. RITZ WOLLER.